(No Model.)
T. CRADDOCK.
NUT LOCK.
No. 598,302.  Patented Feb. 1, 1898.
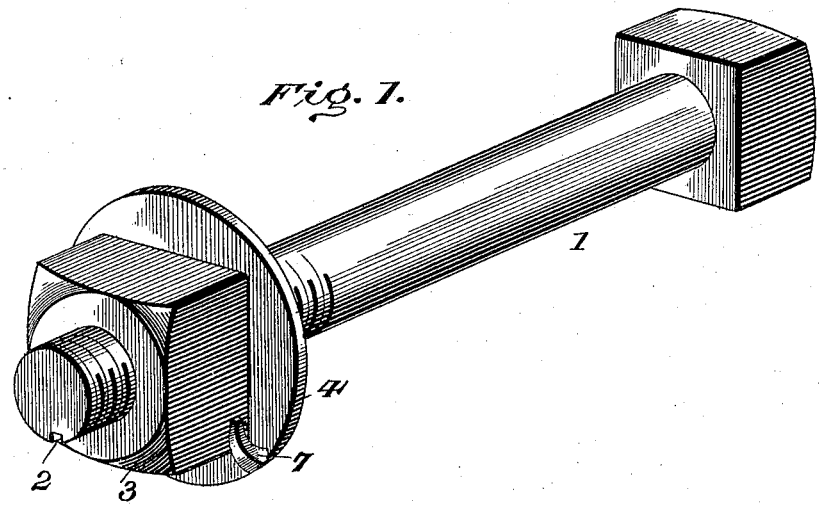
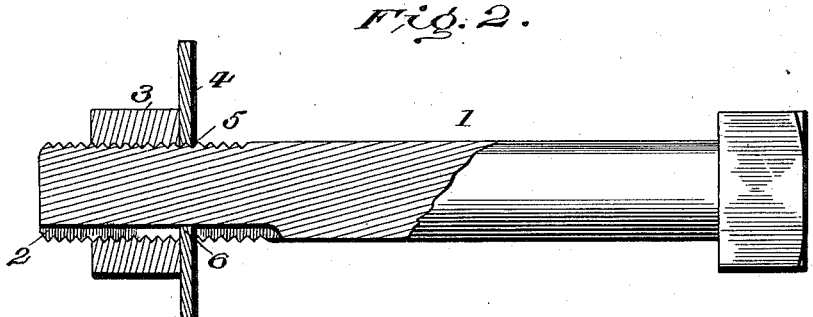
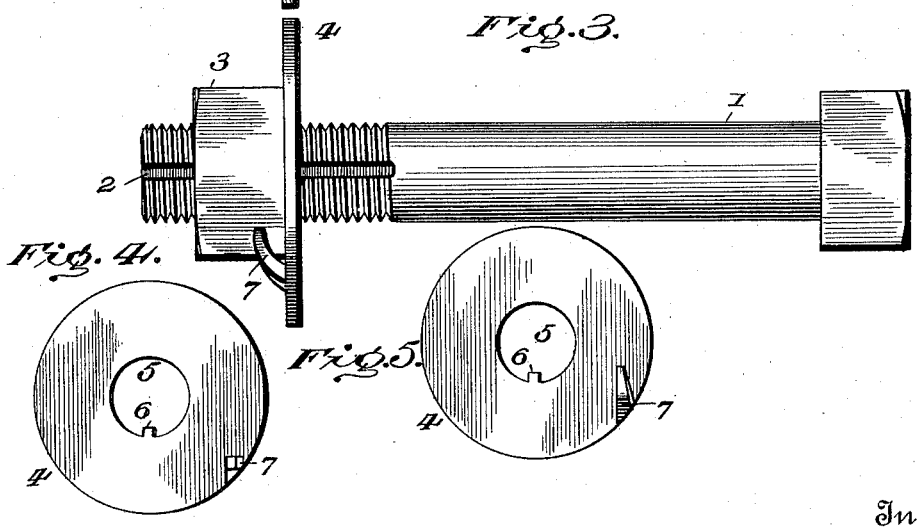
Witnesses
Inventor
Thomas Craddock
by R.S. & A.B. Lacey
his Attorneys

UNITED STATES PATENT OFFICE.

THOMAS CRADDOCK, OF PROVIDENCE, RHODE ISLAND.

NUT-LOCK.

SPECIFICATION forming part of Letters Patent No. 598,302, dated February 1, 1898.

Application filed June 17, 1897. Serial No. 641,119. (No model.)

*To all whom it may concern:*

Be it known that I, THOMAS CRADDOCK, a citizen of the United States, residing at Providence, in the county of Providence and State of Rhode Island, have invented certain new and useful Improvements in Nut-Locks; and I do hereby declare the following to be a full, clear, and exact description of the invention, such as will enable others skilled in the art to which it appertains to make and use the same.

My invention relates to a novel form of nut-lock for railway-tracks and such other structures when a device of this class would be applicable; and the object is to provide a nut-lock that shall be simple and effective in operation and inexpensive in construction.

To this end the novelty consists in the construction, combination, and arrangement of the same, as will be hereinafter more fully described, and particularly pointed out in the claim.

In the accompanying drawings the same reference characters indicate the same parts of the invention.

Figure 1 is a perspective view of my improved nut-lock. Fig. 2 is a longitudinal section of the same. Fig. 3 is a side elevation. Fig. 4 is a plan view of the washer-blank. Fig. 5 shows the same ready for use.

1 represents an ordinary machine-bolt provided with a longitudinal groove or keyway 2.

3 represents the usual nut, and 4 a disk-shaped washer provided with a central orifice 5 for the reception of the bolt 1 and an integral spline or key 6, adapted to engage the keyway 2 in the bolt, and its object is to permit a free longitudinal movement of the washer on the threaded end of the bolt and at the same time prevent any rotary movement of said washer with reference to said bolt.

7 represents an integral tangential tooth or spur formed on the periphery of said washer, and it is adapted to be turned over, as shown in Fig. 1, and project into the path of the corners of the nut, so as to prevent the nut turning backward after it has been screwed home.

In practice the tooth 7 is turned outward at a right angle to the plane of the washer and the washer placed on the bolt under the nut. The nut is then screwed home and the tooth turned back upon the washer, so as to project into the path of one of the sides of the nut. It will be observed that the tooth is located at one side of the radial line of the bolt, and when bent back upon the washer lies on a line parallel with said radial line and bears with its inner side against the nut. The resistance of the tooth is thereby exerted, mainly, in a direction transversely of the nut, while there is comparatively little resistance exerted by the same in a longitudinal direction. By this construction any tendency of the nut to turn is prevented, while at the same time said nut is permitted to have slight longitudinal movement on the bolt to compensate for vibration of the rail parts.

Having thus fully described my invention, what I claim as new and useful, and desire to secure by Letters Patent of the United States, is—

In a nut-lock, the combination with a bolt 1 having a longitudinal groove 2 in its threaded portion, and a nut 3 carried thereby, of a circular disk-shaped solid or non-slitted washer 4 fitted on said bolt and provided with a central spline engaging the groove therein and at its side next the nut with an integral tooth 7 located at one side of the radial line of the bolt extending through said spline but bent up on a line parallel with said radial line so as to lie in the path of the side of the nut and bear with its side edge thereon, substantially as described.

In testimony whereof I affix my signature in presence of two witnesses.

THOMAS CRADDOCK.

Witnesses:
STEPHEN F. CHACE,
CALVIN H. BROWN.